Dec. 21, 1943.  R. B. BARNES  2,337,306
METHOD AND APPARATUS FOR QUANTITATIVE ANALYSIS
OF RADIOACTIVE SUBSTANCES
Filed March 28, 1942  3 Sheets-Sheet 1
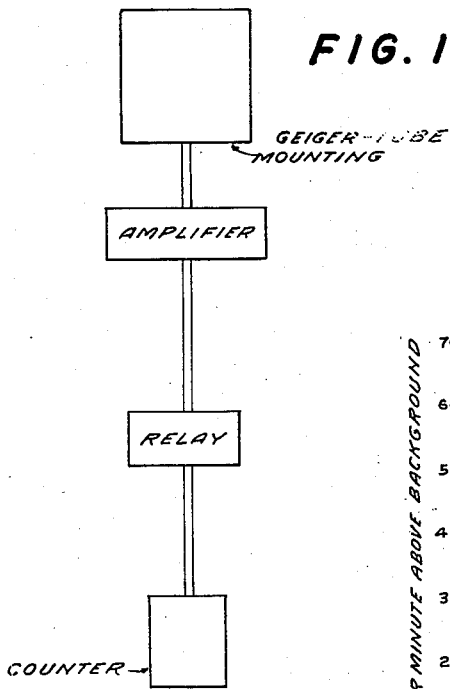
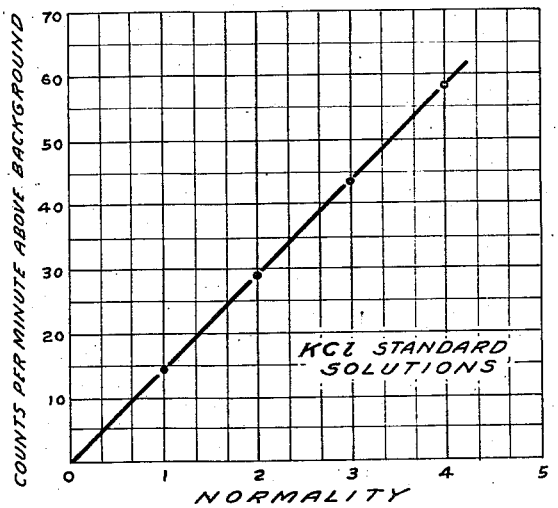
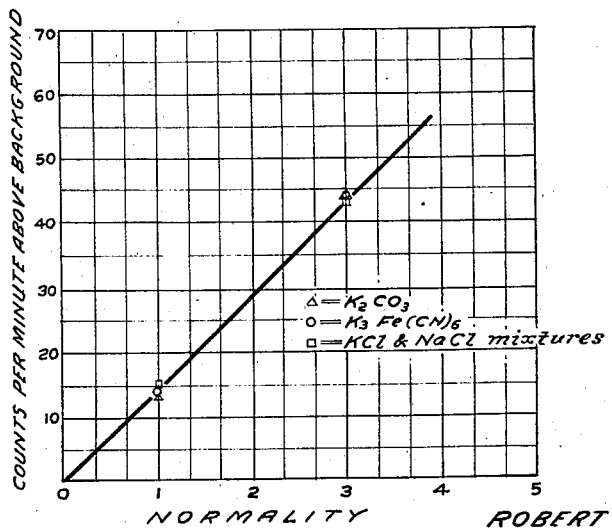
INVENTOR.
ROBERT BOWLING BARNES,
BY Frank J. Novotny
ATTORNEY.

Patented Dec. 21, 1943

2,337,306

UNITED STATES PATENT OFFICE 2,337,306

METHOD AND APPARATUS FOR QUANTITATIVE ANALYSIS OF RADIOACTIVE SUBSTANCES

Robert Bowling Barnes, Stamford, Conn., assignor to American Cyanamid Company, New York, N. Y., a corporation of Maine Application March 28, 1942, Serial No. 436,628

5 Claims. (Cl. 250—83.6)

This invention relates to a new method and an improved apparatus for conducting quantitative analyses. More particularly, it embraces a method of determining the total quantity of an element present in a sample where that element is present in the form of its radioactive and non-radioactive isotopes.

In one of its broader aspects, the invention contemplates the measurement of the radioactivity emitted by a radioactive isotope of an element being determined, and the calculation therefrom of the total quantity of the element present. The radioactivity of the element being determined may be that naturally occurring or that of an artificially radioactivated isotope of the element. Preferably, the process is practiced in the absence of unknown, interfering radioactivity. However, the radioactivity measured may be the result of the combined emission of two or more radioactive isotopes of the element being determined, and invariably the radioactive isotope or isotopes comprise a known or readily determinable proportion of the total quantity of the element being determined.

Heretofore a quantitative analysis of a sample in order to determine, for example its potassium or rubidium content, necessitated the expenditure of considerable time and involved resorting to numerous analytical techniques, such as drying, ashing, removal of contaminating anions, and the like. Such an analysis is usually found to be particularly troublesome when various other alkaline materials and certain anions are also present.

It is a major object of this invention to make possible the rapid and easy quantitative analysis of samples, such as gaseous, liquid and solid compositions, containing a radioactive substance. It is a further object hereof to effect this analysis without destroying the sample. After being subjected to the analysis exemplary of this invention, the sample, if a liquid, can be combined with the original for further use. Another object hereof is to make possible the analysis of samples regardless of the size of the sample available. These objects will become further clarified in the examples of the following description, and other and similar objects will suggest themselves to those versed in the related art.

To this end the invention is particularly described herein as applied to the determination of the quantity of potassium present in a solution containing the salts thereof. The examples given are merely illustrative and are not to be construed as limiting the invention.

The improvements and advantages of the present invention are more readily appreciated when considered in conjunction with the appended drawings forming a part of this description and in which:

Figure 1 is a schematic illustration of a Geiger-Müller counter for measuring the amount of radioactive material present in a sample;

Fig. 2 is a graph showing the substantially linear relationship between the radioactive emissions of an ordinary solution containing potassium and the concentration of the potassium contained therein;

Fig. 3 is a somewhat similar graph showing the measurement of the quantity of potassium present in three additional samples, some of which contain relatively complex ions as well as mixed salts;

Figure 4:
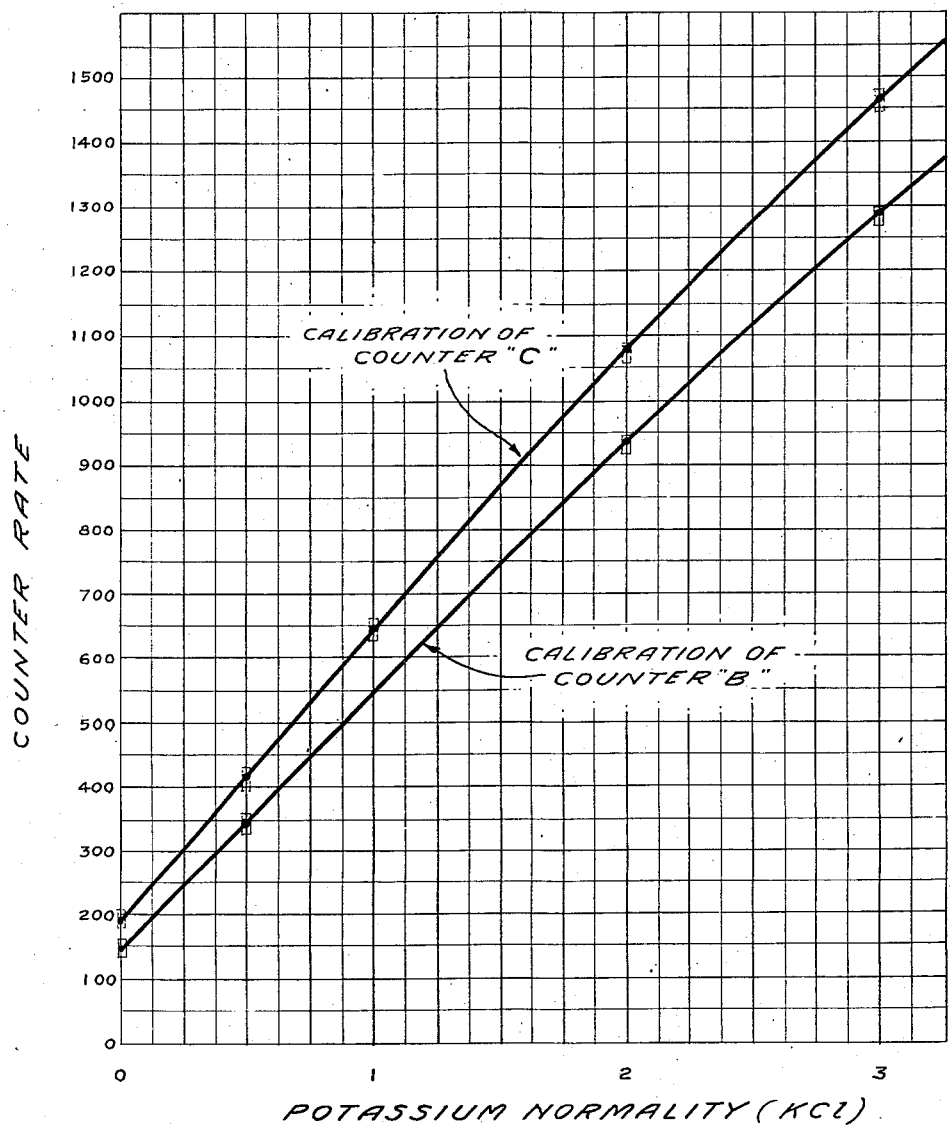
Fig. 4 is a graph showing calibration curves for each of two Geiger-Müller tubes which are many times more sensitive than those used in Figs. 2 and 3. This figure shows the slight deviation from a straight line graph due to the increase in density with higher concentration serving to screen out some of the counts.

This invention is predicated upon the discovery that naturally or artificially radioactive elements give off or emit radiations such as beta-rays or electrons, and gamma-rays or X-rays of very short wave length, in amount depending on the quantity of the radioactive element present and in a statistical manner. The radioactivity of such elements can be readily measured, for example, with a Geiger-Müller counter. In naturally radioactive elements such as potassium, rubidium and the like, the radioactive isotope or isotopes are invariably present as a known proportion of the total quantity of the element being determined. Hence the amount of that particular element present in a given sample can be calculated with the same degree of accuracy as the measurement of the radioactivity of the radioactive isotope present.

This method of analysis can be extended generally for there are a number of other elements which occur in the form of naturally radioactive isotopes or in the case of still other elements, artificially radioactive isotopes thereof can be prepared. These radioactive isotopes when present or when artificially prepared may be added to the non-radioactive isotope or isotopes of the element being determined as a known or readily determinable proportion of the total quantity of the element present. Then, by measuring quantitatively the radiations emitted by one or more of the radioactive isotopes present in the sample, the total quantity of the element present can be determined.

Although the radiations given off by a radioactive substance may be determined by means of a simple electroscope, a more suitable measure of this radioactivity for the purposes of this invention is possible with the conventional Geiger-Müller counter which can be obtained from commercial scientific instrument makers. This apparatus makes use of the fact that the rays emitted from a radioactive substance are in a form capable of ionizing a gas through which they pass; the number of ions formed in the gas is a function of the number of rays emitted. A Geiger tube is used, together with its associated amplifying, counting, etc., circuits well known to those versed in the art, to measure this discharge within the tube. This apparatus operates because the rays or particles from the radioactive substances are transmitted through the shell of the Geiger tube and together with the voltage impressed on the tube ionize the contained gas or gases, thereby causing a current to flow through the external circuit used to impress the voltage on the tube. This current is amplified and utilized to trip a relay counter, thus recording the particle which caused the ionization of the gas in the Geiger-Müller tube and thereby giving a statistical measure of the amount of the radioactive isotope present which originally caused the ionization of the gases in the Geiger-Müller tube.

For example, it has been found that a radioactive isotope of potassium is present naturally and uniformly as a small part, namely of the order of .012% in association with ordinary potassium. This naturally radioactive isotope, known as $K^{40}$, has an extremely long half-life, of the order of $1\times10^9$ years, any decay which takes place while the analysis for potassium is being conducted by the measurement of its radioactivity can be safely neglected, being within the field of experimental error.

Since the proportion of the radioactive isotope of potassium to the non-radioactive isotope is known, a quantitative measurement of the radioactivity of the radioactive isotope, namely $K^{40}$, may be used as the basis for calculating the total quantity of potassium present in the sample in accordance with the method of this invention.

In the following examples four samples of potassium chloride were prepared as typical of one of the simplest potassium solutions. The concentrations of these solutions were 1, 2, 3 and 4 N, respectively. The radiation from these solutions after deducting the background count (due to the presence of stray, naturally or artificially radioactive substances near or in the counter or to cosmic rays which penetrate the two or more inches of lead shielding used on the conventional Geiger counter tubes) was as follows:

| Normality of KCl solution | Net counts per minute | Normality indicated by count |
|---|---|---|
| 1 | 14.3 | 0.98 |
| 2 | 29.1 | 1.98 |
| 3 | 44.0 | 3.00 |
| 4 | 58.4 | 3.96 |

The substantially linear relationship of the radiation as a function of the concentration of potassium chloride is graphically illustrated in Fig. 2.

As shown in Fig. 3, similar results were obtained when various other solutions of potassium salts were used. Thus, even a compound having an anion larger than the chloride ion as by preparing one and three norml solutions of potassium carbonate likewise gave results which showed that the emission is substantially a linear function of the concentration of the potassium salt present. Potassium ferricyanide, a substance which contains a very heavy and large anion, gave exactly the same results as the other potassium solutions. Similarly, potassium salts in the presence of other alkali metals gave results which confirmed the fact that the emission was substantially a linear function of the concentration of the potassium alone. The following tabulation of results obtained with various potassium solutions was used to prepare the graph shown in Fig. 3:

Table

| Solution | Known normality | Net count per minute | Normality indicated by count |
|---|---|---|---|
| $K_2CO_3$ | 1 | 12.7 | 0.87 |
| $K_3Fe(CN)_6$ | 1 | 14.1 | 0.96 |
| KCl | 1 | 14.8 | 1.01 |
| NaCl | 3 | | |
| $K_2CO_3$ | 3 | 44.3 | 3.03 |
| $K_3Fe(CN)_6$ | 3 | 44.1 | 3.01 |
| KCl | 3 | 43.5 | 2.97 |
| NaCl | 1 | | |

As a test of the reliability of this method of analysis, solutions containing the following salts were submitted to examination by the apparatus and method of this invention (actual normality of unknown about 1.1):

| | Unknown | Blank |
|---|---|---|
| | G. | G. |
| NaCl | 10 | 10 |
| $Fe(NH_4)(SO_4)_2.12H_2O$ | 1 | 1 |
| $CaCl_2$ | 5 | 5 |
| $NH_4Cl$ | 5 | 5 |
| KCl | 20 | 0 |

After a two hour count of emitted radioactivity, a count of 2040 net counts was obtained. When reduced to net counts per minute, 17 net counts per minute is obtained. The latter figure applied to the graph of Fig. 3 indicates a potassium content equivalent to about 1.16 N. Using regular gravimetric or volumetric analysis would necessitate the expenditure of much more time, perhaps as much as three days, in order to remove interfering ions from the solution before the actual potassium determination could be undertaken.

In order to measure the radioactivity of a material with absolute accuracy it is necessary to measure its radioactivity, as with a Geiger-Müller counter, over a long interval. However, for practical purposes, it is possible to measure the radioactivity of a material with a known degree of accuracy by making use of statistical formulae and probability equations. The following table shows the relationship existing between the probable error and the minimum number of counts required for the stated accuracy.

| Probable error | Total net counts |
|---|---|
| 10% | 45 |
| 5% | 180 |
| 3% | 450 |
| 1% | 4,500 |
| 0.5% | 18,000 |
| 0.1% | 450,000 |

Although in the examples given above a naturally radioactive element has been used, it is also possible to use substances having artificially induced radioactivity.

In the particular examples enumerated, the radioactive isotope of potassium, $K^{40}$, has an extremely long half-life, of the order of $1 \times 10^9$ years, and hence no provision need be made for any decay which may take place during the analysis for potassium by radioactivity measurements in accordance with this invention.

Where, however, measurement is made on a basis of a radioactive isotope having a half-life so short that it appreciably affects the accuracy of the results due to the duration of the time interval of the test, then provision for the disintegration or decay must be made by using the following equation for radioactive decay:

$$N_t = N_0 e^{-\lambda t}$$

where $N_t$ is the number of atoms of the radioactive element after a time interval $t$, $N_0$ is the number of atoms when $t=0$ and $\lambda$ is the constant for the disintegration of the particular element being analyzed.

This type of analysis may also be applied to the quantitative determination of the amount of a radioactive element or elements present in any environment under the specified circumstances. This may include elements in which the radioactivity occurs naturally or is artificially induced. Such elements may include radioactive iron, sulfur, sodium, calcium, cobalt, zinc, carbon, chromium, manganese, and the like among numerous others.

Where more than one radioactive isotope exists or can be made to exist coincidentally either with or without non-radioactive isotopes, this existing ratio may be first determined by the usual radioactivity measurement methods such as by consecutive screening and calculation by difference.

It will be seen that this method of analysis is particularly desirable in biochemical processes in following or tracing an element, a portion of which is naturally radioactive or may be made artificially radioactive.

For instance, iron may be artificially activated and a known quantity thereof added to a known quantity of non-radioactive iron in a predetermined and desired ratio. After administering this mixture, it may be desirable upon the lapse of a considerable time interval to determine the total quantity of iron then present in that environment. This can be done by measuring at that time the quantity of radioactive iron present by the method of this invention and calculating therefrom the total quantity of iron then present.

Where radioactive elements having a comparatively short half-life are used, the above formula for estimating their decay or deterioration either during the period of analysis or during the period of the biological test will be found useful.

Within the usual laboratory ranges of normality for various potassium solutions and when a relatively insensitive Geiger-Müller counter is used as was the case for gathering the facts for the graphs of Figs. 2 and 3, it is practically unnecessary to make provision for any variation in density due to increased amounts of the particular potassium salt dissolved and the effect of this increased density as a screen or impediment to the passage of a certain portion of the emitted radioactivity therethrough. For example, the wide range of normality of KCl from 1 N to 3 N is concomitant upon an increase in density of only 1.04 to about 1.13. Hence it is obvious that such variations in density have little measurable effect upon the net count of an insensitive Geiger-Müller counter and any variation therefore noted in the apparatus and net count made in obtaining the graphs of Figs. 2 and 3 can be considered within the field of experimental error. It is only with an extremely sensitive Geiger-Müller counter, far more sensitive than that used to plot the graphs of Figs. 2 and 3, that any appreciable change can be detected, and even then, as may be seen by referring to the graphs of the two Geiger-Müller counter tubes C and B shown in Fig. 4, in the above density range any change in count due to the increased amount of potassium only in solution is still too small to vary the graph from a substantially straight line.

In order to make a calibration curve where the screening effect of density is perceptible, a highly sensitive tube and a graph such as that shown in Fig. 4 for the lower or B counter tube was used, and two readings were made as shown on each of the following solutions of potassium chloride. A smooth curve was drawn between the average readings for each normality.

| Normality of KCl solution | Total counts per minute |
|---|---|
| 0.50 | 340.0 |
|  | 342.2 |
| 2.00 | 925.0 |
|  | 937.3 |
| 3.00 | 1,275.0 |
|  | 1,297.1 |

For the lower curve of Fig. 4 calibrating counter tube B, the measurement of radiation from the solutions after deducting the background count (141.1 per minute) gave the following results:

| Normality of KCl solution | Total counts per minute | Net counts per minute |
|---|---|---|
| 0.50 | 346.1 | 205 |
| 2.00 | 931.1 | 790 |
| 3.00 | 1,286.1 | 1,145 |

From these figures and the lower graph of Fig. 4 it is evident that the result although substantially a straight line, shows a logarithmic decrement in the higher density regions. Any non-linearity of the count-concentration curve is thus seen to be caused by variations in the density of the solution. Any non-linearity can be effectively accounted for by using the following equation (derived below) for the lower curve of Fig. 4:

$$\log N = \log (c/m) - 2.8525 + 0.234d \quad (1)$$

where $N$ = normality $c/m$ = counts per minute above background count
$d$ = density Using this equation to calculate the normality of a solution from the observed net counts and measured density of the solution, the following close correlation between observed and calculated normality is obtained:

| Density | Net counts per minute observed | Normality Observed | Normality Calculated |
|---|---|---|---|
| 1.022 | 205 | 0.50 | 0.499 |
| 1.089 | 790 | 2.00 | 1.994 |
| 1.131 | 1,145 | 3.00 | 2,953 |

Thus an equation of the form (1) will reproduce results of calculated normality with a precision of 1% of that actually present.

From the above discussion it may be seen that variations in count due to density increases may be readily evaluated. In any case, the particular Geiger-Müller counter can be calibrated as a means for measuring the radioactivity of a particular potassium solution of unknown normality by determining the radiation of a standard solution, i. e., 1 N, 2 N, 3 N, or 4 N potassium chloride solution, and comparing the radioactivity as observed from a tabulation of the net counts with the radiation from a solution of unknown normality. In this manner any variation in net count due to failure to consider the increase in the density of the solution due to the presence of additional quantities of the potassium salt is already taken into consideration.

However, where additional substances, such as glucose, dextrose, zinc chloride, and similar and other highly soluble substances are present in such quantities as to greatly increase the density of the solution, the Geiger-Müller counter must be calibrated in order to provide for the excessive variation of the net counts from those falling on a substantially straight line. Such variation is caused by the screening effect of the increased density.

Figure 5:
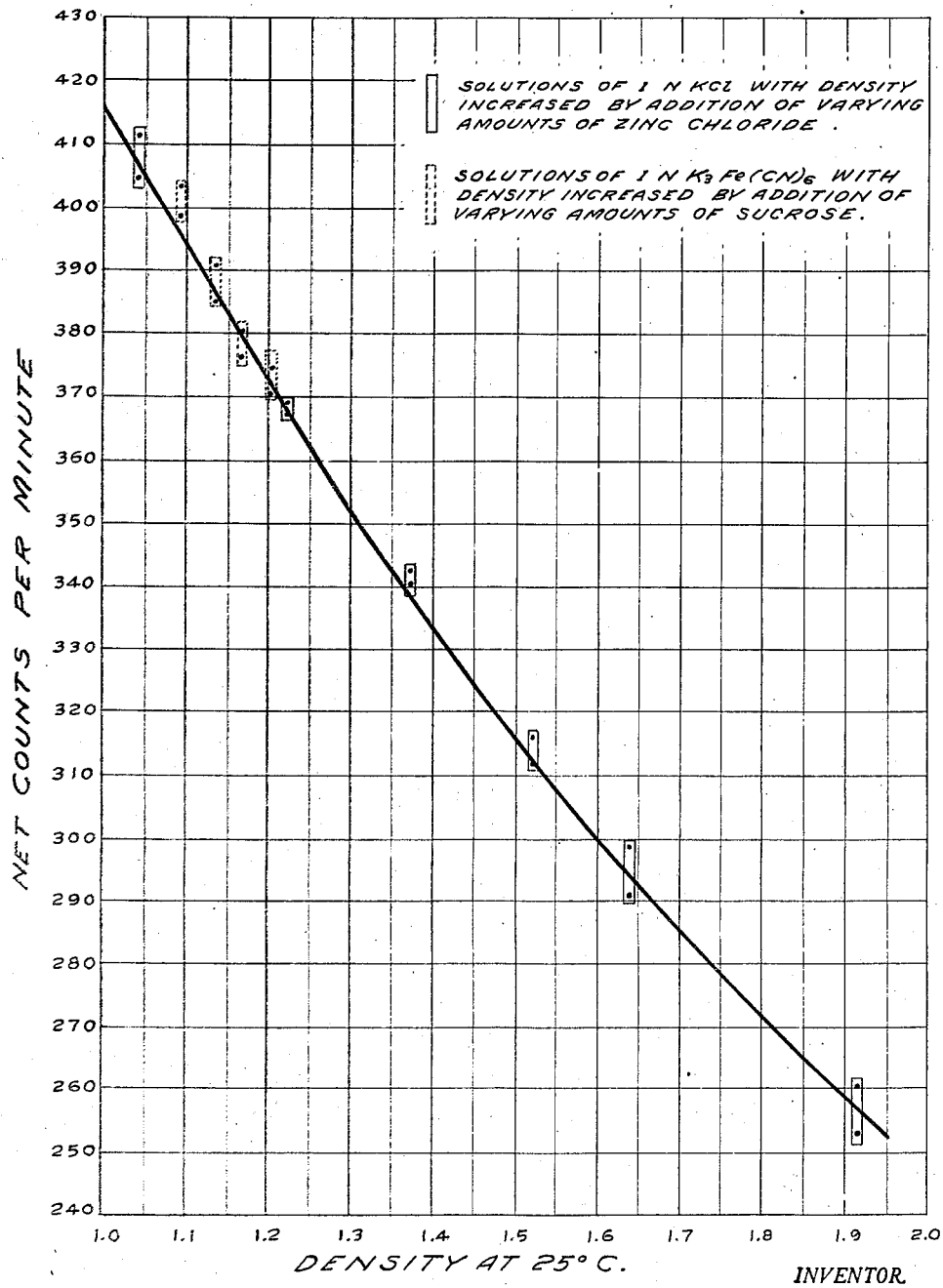
Fig. 5 is a graph showing the screening effect and consequent lowering of the net count on a 1 N solution of potassium chloride resulting when the density of the solution is increased by the addition of highly soluble substances.

Provision for such screening effects of density are clearly shown in Fig. 5. The calibration curve shown in Fig. 5 was obtained for a 1 N KCl solution using varying amounts of zinc chloride, as indicated below, to increase the density of the solution. A 250 cc. volumetric flask was used in each case, adding 125 cc. of a 2 N KCl solution thereto, the indicated amount of zinc chloride was then added and the solution made up to 250 cc. with distilled water, thereby resulting in a solution 1 normal as to KCl. Two readings of the gross count per minute were made in each case, using the same counter tube as in the lower curve of Fig. 4 and counting over a period of 20 minutes. (Background count 141.1 counts per minute.)

| Zinc chloride added | Density | Gross counts per minute | Net counts per minute |
|---|---|---|---|
| 250 g | 1.9156 | 401.6 | 260.5 |
|  |  | 394.4 | 253.3 |
| 196 g | 1.6428 | 430.8 | 289.7 |
|  |  | 439.6 | 298.5 |
| 142 g | 1.5229 | 453.6 | 312.5 |
|  |  | 457.7 | 316.6 |
| 97 g | 1.3736 | 483.6 | 342.5 |
|  |  | 482.0 | 340.9 |
| 59 g | 1.2168 | 509.9 | 368.8 |
|  |  | 508.8 | 367.7 |
| 0 g | 1.0428 | 546.0 | 404.9 |
|  |  | 553.6 | 412.5 |

In order to obtain still more points on the curve and further corroborate the effect of an increase in density in diminishing the count, solutions were made up of 125 cc. of 2 N $K_3Fe(CN)_6$ using sucrose in order to increase the density in accordance with the following indicated table, distilled water was added to make up 250 cc., e. g., a 1 N solution, and counts taken as in the zinc chloride examples.

| Sucrose added | Density | Gross count per minute | Net count per minute |
|---|---|---|---|
| 25 g | 1.0939 | 539.2 | 398.1 |
|  |  | 545.6 | 404.5 |
| 50 g | 1.1319 | 531.7 | 390.6 |
|  |  | 526.4 | 385.3 |
| 75 g | 1.1692 | 517.8 | 376.7 |
|  |  | 521.1 | 380.0 |
| 100 g | 1.2026 | 516.8 | 375.7 |
|  |  | 511.2 | 370.1 |

The curve shown in Fig. 5 may be expressed by the simple equation of the form:

$$\log (c/m) = k + \log N - a \cdot d \quad (2)$$

where the letters have the meaning above given under Equation 1 and $a$, $k$ are constants, which may be readily determined by substituting the known values from two of the above experiments and obtaining two equations and two unknowns, e. g., $a$ and $k$, whereupon the equation for the graph of Fig. 5 becomes:

$$\log (c/m) = 2.8525 + \log N - 0.234d \quad (3)$$

transposing log N of Equation 3 gives Equation 1 directly.

Using Equation 3 to calculate the normality of a solution from the observed net counts and the measured density of the particular solutions, the following close correlation between observed and calculated normality is obtained:

| Density | Potassium salt solutions | | |
|---|---|---|---|
|  | Net counts per minute observed | Normality | |
|  |  | Observed | Calculated |
| 1.044 | 405 | 1.00 | 0.999 |
| 1.044 | 408 | 1.00 | 1.006 |
| 1.100 (+25 g. sucrose) | 394 | 1.00 | 1.000 |
| 1.20 (sucrose added) | 374 | 1.00 | 1.003 |
| 1.30 (sucrose added) | 354 | 1.00 | 1.000 |
| 1.50 (sucrose added) | 318 | 1.00 | 1.002 |
| 1.80 (sucrose added) | 272 | 1.00 | 1.008 |

Thus, in any case, the cause of the non-linearity of the count-concentration curve can be attributed to the variation in density of the solution and in the range of density, from 1.0 to 2.0 and of concentration from 0.5 to 3.0 an equation of the form (2) will reproduce the results with a precision of 1%.

It is to be noted that Equation 2 applies for any counter tube. The constants $a$ and $k$, however, differ for each tube. In order to evaluate $a$ and $k$, determinations on two solutions as above described are necessary for each tube. It is usually most convenient to measure the counting rate of the particular tube to be calibrated for two different normalities of KCl, since the densities of such solutions are well known. Using this method the equation for counter tube C of Fig. 4 becomes:

$$\log (c/m) = 3.1555 + \log N - 0.463d \quad (4)$$

Although it is not intended to be limited by any theory as to why $a$ and $k$ vary from tube to tube, it is submitted that the wall thickness of the counter tube, the degree of vacuum used therein, the various gases within the tube, the distance from the radioactive materials, the size of the tube electrodes, and the like, all have an effect on the constant $k$. The reason for the variation in $a$, however, seems to lie in the fact that β-particles from potassium seem to show a range of energies and a thicker walled counter would screen out more of the weaker β-rays, thus countermanding the effect of density as a cause of the drop in the radioactivity count.

The measurement of the total count should, preferably, take place in the absence of any other unknown radioactive material, because if, for example, the quantity of potassium is being determined and another radioactive substance is present, the high net count will not reflect the net count due to the amount of radioactive potassium present. However, if the quantity of the other radioactive material is known then its net count can be included as part of the background count and thus the quantity of potassium present can be determined. In a similar manner, using the methods herein disclosed, the total content of an element having, or capable of having induced, radioactivity, can be determined wherever it occurs, such as in glassware, resins, natural minerals, seawater and the like. This technique can be used at various temperatures, as the rate of disintegration, and hence the net count, is not affected by the temperature. Thus it can be applied in exactly the same manner as the quantitative determination of radioactive elements used as tracer elements in biological assays.

It is to be understood that the examples given are merely illustrative embodiments of this invention, the scope of which is to be determined solely by the following claims.

I claim:

1. The method of determining the total quantity of an element chosen from the group consisting of potassium, rubidium, iron, sulfur, sodium, calcium, cobalt, zinc, carbon, chromium, and manganese, which element occurs in a sample in the form of its radioactive and non-radioactive isotopes, and in the substantial absence of unknown, interfering radioactivity, which comprises measuring the radioactivity emitted from the radioactive isotope in apparatus calibrated by measuring the radioactivity of standard solutions under similar conditions and where the radioactive isotope is subject to decay which, if not allowed for, would materially affect the accuracy of the final determination, applying to that measurement a decay factor calculated according to the formula:

$$N_t = N_o e^{-\lambda t}$$

where $N_t$ is the number of atoms of the radioactive element after a time interval $t$, $N_o$ is the number of atoms when $t=0$, and $\lambda$ is the constant for the disintegration of the particular element being analyzed, and calculating therefrom the total quantity of the element present.

2. The method of determining the total quantity of an element present in a sample where that element occurs in the form of its radioactive and non-radioactive isotopes, where the radioactive isotope is subject to decay which, if not allowed for, would materially affect the accuracy of the final determination, and in the substantial absence of unknown, interfering radio-activity, which comprises measuring the radioactivity emitted from the radioactive isotope in apparatus calibrated by measuring the radioactivity of standard solutions under similar conditions and applying to that measurement a decay factor calculated according to the formula:

$$N_t = N_o e^{-\lambda t}$$

where $N_t$ is the number of atoms of the radioactive element after a time interval $t$, $N_o$ is the number of atoms when $t=0$, and $\lambda$ is the constant for the disintegration of the particular element being analyzed, and calculating from the resulting figure the total quantity of the element present.

3. The method of determining the normality of a solution of unknown normality containing a potassium salt which comprises measuring the radioactivity of the solution in apparatus comprising a Geiger tube, calibrating the apparatus used by determining the radiation of a standard solution under similar conditions and comparing the radioactivity as observed from a tabulation of the net counts of the standard solution with the radiation from the solution of unknown normality, due allowance being made in each measurement of the radioactivity and radiation for a decay factor calculated according to the formula:

$$N_t = N_o e^{-\lambda t}$$

where $N_t$ is the number of atoms of the radioactive element after a time interval $t$, $N_o$ is the number of atoms when $t=0$, and $\lambda$ is the constant for the disintegration of the particular element being analyzed.

4. The method of determining the total quantity of potassium present in a sample where the potassium occurs in the form of its radioactive and non-radioactive isotopes, and in the substantial absence of unknown, interfering radioactivity, comprising measuring the radioactivity emitted from the radioactive isotope in apparatus calibrated by measuring the radioactivity of standard potassium solutions under similar conditions, applying to that measurement a decay factor calculated according to the formula:

$$N_t = N_o e^{-\lambda t}$$

where $N_t$ is the number of atoms of the radioactive element after a time interval $t$, $N_o$ is the number of atoms when $t=0$, and $\lambda$ is the constant for the disintegration of the particular element being analyzed, and calculating therefrom the total quantity of potassium present.

5. The method of determining the total quantity of potassium present in a sample where the potassium occurs in the form of its radioactive and non-radioactive isotopes in a known ratio, and in the substantial absence of unknown, interfering radioactivity, comprising measuring the radioactive element from the radioactive isotope in apparatus calibrated by measuring the radioactivity of stanadrd potassium solutions under similar conditions and applying to that measurement a decay factor calculated according to the formula:

$$N_t = N_o e^{-\lambda t}$$

where $N_t$ is the number of atoms of the radioactive element after a time interval $t$, $N_o$ is the number of atoms when $t=0$, and $\lambda$ is the constant for the disintegration of the particular element being analyzed, and calculating therefrom the total quantity of potassium present.

ROBERT BOWLING BARNES.